No. 671,391. Patented Apr. 2, 1901.
M. THOMSEN.
GEARING FOR WASHING MACHINES.
(Application filed July 30, 1900.)

(No Model.)

Witnesses:
Edw. Barritt
A. Gustafson

Inventor
Max Thomsen
By Chas. C. Gillman Atty.

UNITED STATES PATENT OFFICE.

MAX THOMSEN, OF CHICAGO, ILLINOIS.

GEARING FOR WASHING-MACHINES.

SPECIFICATION forming part of Letters Patent No. 671,391, dated April 2, 1901.

Application filed July 30, 1900. Serial No. 25,269. (No model.)

*To all whom it may concern:*

Be it known that I, MAX THOMSEN, a citizen of the United States, residing at Chicago, in the county of Cook and State of Illinois, have invented certain new and useful Improvements in Gearing for Washing-Machines, of which the following is a specification.

This invention relates to improvements in gearing for converting rotary motion into oscillatory motion or for imparting reciprocating movement, and while it is more especially intended to be used on washing-machines of that class employing an oscillating rubber or agitator, yet it is applicable to churns and for other purposes; and it consists in certain peculiarities of the construction, novel arrangement, and operation of the various parts thereof, as will be hereinafter more fully set forth and specifically claimed.

Figure 1:
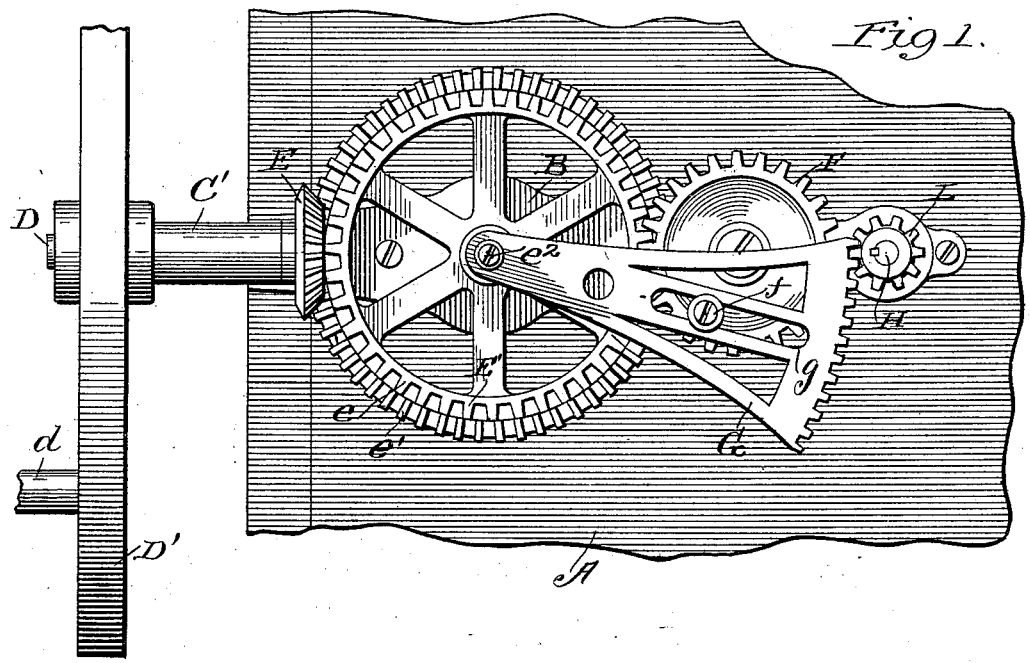
Figure 2:
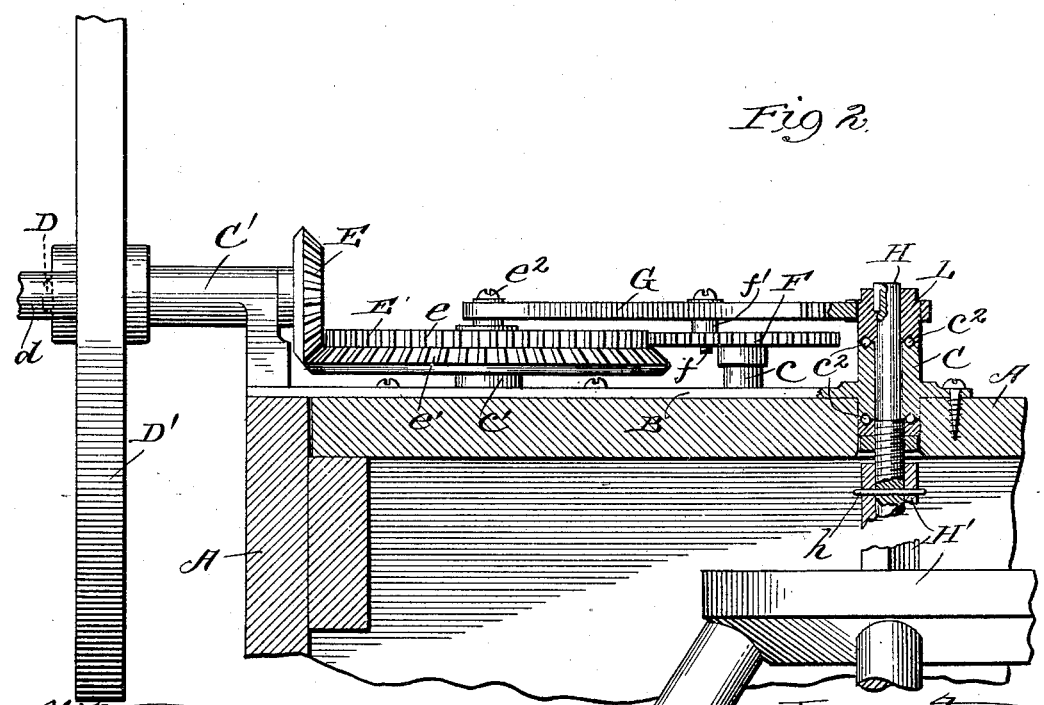

In order to enable others skilled in the art to which my invention pertains to make and use the same, I will now proceed to describe it, referring to the accompanying drawings, in which—
Figure 1 is a plan view of a portion of a washing-machine with my gearing applied thereto and the parts in position ready for use, and Fig. 2 is a view partly in section and partly in elevation.
Similar letters refer to like parts throughout both views of the drawings.

A represents the support or main frame for the gearing, which in the present instance is shown as the upper portion of the suds-box of a washing-machine, but which may be a churn or other device or receptacle to which the gearing is adaptable. Secured to the support A, and usually to the top thereof, is a plate or casting B, which is provided near one of its ends with a vertical bearing or journal-box C and near its other end with a bearing or journal-box C' and between said bearings with bosses $c$ and $c'$, on which portions of the gearing are journaled, as will be presently explained. Journaled in the bearing C' is the driving-shaft D, on one end of which is mounted a fly-wheel D', having a handle $d$ to turn the same, and on the other end of said shaft is secured a beveled gear E, which meshes with the beveled portion of the gear E', which is partly a spur-gear $e$ and a beveled gear $e'$ and is journaled on the boss $c'$, as is clearly shown in Fig. 2 of the drawings.

Journaled on the boss $c$ is a spur-gear F, which meshes with the spur-gear portion $e$ of the gear E' and which carries a projection or shaft $f$, which is preferably provided with a friction-roller $f'$ to fit and operate in the slot $g$ of the segmental gear G, one end of which gear is pivotally secured on the shaft $e^2$ of the gear E', as is clearly shown.

Journaled in the box or bearing C is a shaft H, which is preferably partially screw-threaded to receive or engage a portion of the rubber or agitator H' of the washing-machine or the dasher of a churn. The bearing or box C is provided with antifriction-balls $c^2$, on the upper ones of which will rest a hub of the gear L, which meshes with the segmental gear. The gear L is keyed or fixed to the shaft H, and the rubber or agitator H' may be secured to said shaft by means of a pin $h$ or otherwise.

While I have shown the plate B, bearings C and C', and bosses $c$ and $c'$ as being integral and prefer to so construct them, yet I do not desire to be limited to such a construction, as I may journal the different gears in any suitable manner without departing from the spirit of my invention. I have also shown a fly-wheel D' on the driving-shaft D; but it is apparent that I may employ instead thereof a crank for the operation of the gearing.

From the foregoing, and by reference to the drawings, it will be seen and readily understood that by turning the shaft D in one direction the rotary motion thereof will be converted into an oscillating or reciprocating movement, thus causing the rubber or agitator H' to turn back and forth on its shaft, for the gear E, meshing with the beveled portion $e^h$ of the gear E', will rotate said gear, which will in turn cause the gear F to rotate by reason of its engagement with the spur-gear portion $e$ of the gear E', and as the gear F carries the shaft or projection $f$, which is located in the slot $g$ of the segmental gear, said segmental gear will be caused to reciprocate in its movement and impart said motion to the gear L and through it to the agitator or rubber.

Having thus fully described my invention, what I claim as new, and desire to secure by Letters Patent, is—

1. In a gearing for washing-machines and the like, the combination with a driving-shaft suitably journaled and having on one of its ends a beveled gear, of a compound gear suitably journaled, and having a spur-gear portion and a beveled-gear part, said beveled-gear part meshing with the beveled gear on the driving-shaft, a shaft suitably journaled and having on one of its ends a spur-gear and its other end adapted to receive or engage a rubber or the like, a segmental gear pivotally secured at one of its ends and engaging the spur-gear on the last-named shaft and provided with a slot, and a spur-gear suitably journaled and meshing with the spur-gear portion of the compound gear and provided with a projection extending into the slot of the segmental gear, substantially as described.

2. In a gearing for washing-machines and the like, the combination with a driving-shaft suitably journaled and having on one of its ends a beveled gear, of a compound gear suitably journaled and having a spur-gear portion and a beveled-gear part, said beveled-gear part meshing with the beveled gear on the driving-shaft, a shaft suitably journaled in antifriction-bearings and having on one of its ends a spur-gear and its other end adapted to receive or engage a rubber or the like, a segmental gear pivotally secured at one of its ends on the shaft of the compound gear and engaging the spur-gear on the rubber-shaft and having a slot, another spur-gear suitably journaled and meshing with the spur-gear portion of the compound gear, and a friction-roller journaled on the last-named spur-gear and extending into the slot of the segmental gear, substantially as described.

MAX THOMSEN.

Witnesses:
CHAS. C. TILLMAN,
A. GUSTAFSON.